United States Patent
Ochiai

(10) Patent No.: US 10,487,192 B2
(45) Date of Patent: Nov. 26, 2019

(54) ANTI-VIBRATION RUBBER COMPOSITION AND ANTI-VIBRATION RUBBER

(71) Applicant: BRIDGESTONE CORPORATION, Tokyo (JP)

(72) Inventor: Syo Ochiai, Tokyo (JP)

(73) Assignee: BRIDGESTONE CORPORATION, Chuo-Ku (JP)

( * ) Notice: Subject to any disclaimer, the term of this patent is extended or adjusted under 35 U.S.C. 154(b) by 0 days.

(21) Appl. No.: 15/312,849

(22) PCT Filed: May 8, 2015

(86) PCT No.: PCT/JP2015/063340
§ 371 (c)(1),
(2) Date: Nov. 21, 2016

(87) PCT Pub. No.: WO2015/182349
PCT Pub. Date: Dec. 3, 2015

(65) Prior Publication Data
US 2017/0204248 A1    Jul. 20, 2017

(30) Foreign Application Priority Data

May 27, 2014  (JP) ................................ 2014-109142

(51) Int. Cl.
| | |
|---|---|
| *C08L 7/00* | (2006.01) |
| *C08K 5/24* | (2006.01) |
| *C08K 3/04* | (2006.01) |
| *C08K 3/36* | (2006.01) |
| *C08L 9/00* | (2006.01) |
| *F16F 15/08* | (2006.01) |
| *F16F 1/36* | (2006.01) |
| *C08K 5/25* | (2006.01) |

(52) U.S. Cl.
CPC .................. *C08K 5/24* (2013.01); *C08K 3/04* (2013.01); *C08K 3/36* (2013.01); *C08K 5/25* (2013.01); *C08L 7/00* (2013.01); *C08L 9/00* (2013.01); *F16F 1/36* (2013.01); *F16F 1/3605* (2013.01); *F16F 15/08* (2013.01); *F16F 2224/025* (2013.01)

(58) Field of Classification Search
CPC ............... C08K 5/24; C08L 9/00; C08L 7/00
USPC ........................................................ 524/189
See application file for complete search history.

(56) References Cited

U.S. PATENT DOCUMENTS

| | | | | | |
|---|---|---|---|---|---|
| 1,741,778 | A | * | 12/1929 | Jones ........................ | C08K 5/24 252/401 |
| 5,705,549 | A | * | 1/1998 | Hojo ........................ | C08K 5/25 524/191 |
| 5,939,484 | A | * | 8/1999 | Araki ........................ | C08K 5/17 524/492 |
| 6,506,849 | B1 | * | 1/2003 | Hojo ......................... | B60C 1/00 525/332.7 |
| 6,822,027 | B2 | * | 11/2004 | Shiina ...................... | B60C 1/00 524/189 |
| 7,378,464 | B2 | * | 5/2008 | Aoki ..................... | B60C 1/0016 524/189 |
| 9,062,171 | B2 | * | 6/2015 | Ihara ........................ | C08K 5/25 |
| 9,296,873 | B2 | * | 3/2016 | Koyama ................... | C08K 3/04 |
| 9,920,184 | B2 | * | 3/2018 | Minouchi ................. | C08K 3/04 |
| 2004/0106724 | A1 | * | 6/2004 | Toratani .................. | B29B 13/06 524/575 |
| 2005/0176858 | A1 | * | 8/2005 | Nohara ................. | B60C 1/0016 524/106 |
| 2006/0052506 | A1 | * | 3/2006 | Aoki ..................... | B60C 1/0016 524/492 |
| 2009/0266461 | A1 | * | 10/2009 | Mukai ....................... | B60C 1/00 152/450 |
| 2010/0024937 | A1 | | 2/2010 | Ishizuka | |
| 2010/0249336 | A1 | * | 9/2010 | Yonemoto ............. | B60C 1/0016 525/342 |
| 2012/0232208 | A1 | | 9/2012 | Saito | |
| 2012/0277359 | A1 | * | 11/2012 | Thuilliez ................... | B60C 1/00 524/192 |
| 2013/0264004 | A1 | * | 10/2013 | Yanai ...................... | B29C 33/02 156/123 |
| 2013/0289165 | A1 | * | 10/2013 | De Landtsheer ......... | B60C 1/00 523/351 |
| 2013/0331480 | A1 | | 12/2013 | Suzuki et al. | |
| 2015/0018449 | A1 | * | 1/2015 | Hasegawa ............. | B60C 1/0016 523/156 |
| 2015/0144243 | A1 | * | 5/2015 | Saito ................... | B60C 15/0635 152/541 |

(Continued)

FOREIGN PATENT DOCUMENTS

| | | |
|---|---|---|
| CN | 103391967 A | 11/2013 |
| JP | 8-73658 A | 3/1996 |

(Continued)

OTHER PUBLICATIONS

JP 2006-104372 A (Apr. 20, 2006); machine translation.*
International Search Report for PCT/JP2015/063340 dated Jul. 28, 2015.
Communication dated Apr. 24, 2017 from the European Patent Office in counterpart European application No. 15800078.6.

*Primary Examiner* — Rip A Lee
(74) *Attorney, Agent, or Firm* — Sughrue Mion, PLLC

(57) ABSTRACT

The present invention provides an anti-vibration rubber composition containing: a rubber component containing 60% by mass or more of a diene rubber; a filler containing a carbon black and a silica, a content ratio (a/b) between the carbon black (a) and the silica (b) being 10/90 to 90/10 on a mass basis; and a hydrazine derivative, and an anti-vibration rubber obtained by curing the anti-vibration rubber composition.

5 Claims, No Drawings

(56) References Cited

U.S. PATENT DOCUMENTS

2016/0168365 A1    6/2016    Suzuki et al.

FOREIGN PATENT DOCUMENTS

| | | | |
|---|---|---|---|
| JP | 8-269239 A | 10/1996 | |
| JP | 8-283461 A | 10/1996 | |
| JP | 10-139934 A | 5/1998 | |
| JP | 2000239442 A | 9/2000 | |
| JP | 2001-49047 A | 2/2001 | |
| JP | 2001-172431 A | 6/2001 | |
| JP | 2001213112 A | 8/2001 | |
| JP | 2006-104372 A * | 4/2006 | ............... C08L 7/00 |
| JP | 2006-143859 A | 6/2006 | |
| JP | 2009096980 A | 5/2009 | |
| JP | 2009-298880 A | 12/2009 | |
| JP | 2011-105870 A | 6/2011 | |
| JP | 2011-144320 A | 7/2011 | |
| JP | 2013-147581 A | 8/2013 | |
| JP | 2014-237787 A | 12/2014 | |

* cited by examiner

ANTI-VIBRATION RUBBER COMPOSITION AND ANTI-VIBRATION RUBBER

CROSS REFERENCE TO RELATED APPLICATIONS

This application is a National Stage of International Application No. PCT/JP2015/063340 filed May 8, 2015, claiming priority based on Japanese Patent Application No. 2014-109142 filed May 27, 2014, the contents of all of which are incorporated herein by reference in their entirety.

TECHNICAL FIELD

The present invention relates to an anti-vibration rubber composition and an anti-vibration rubber comprising the same.

BACKGROUND ART

Anti-vibration rubbers are conventionally used in the field of vehicles, general industrial machinery and the like for preventing vibration, noise and the like occurring in an engine, a vehicle body and the like. Performances required of the anti-vibration rubbers include a low dynamic magnification.

In order to improve the anti-vibration performance of an anti-vibration rubber, it is effective that the dynamic magnification (dynamic spring constant (Kd)/static spring constant (Ks)) of an anti-vibration rubber composition corresponding to an anti-vibration member has a sufficiently small value. Accordingly, as the dynamic spring constant obtained in a vibration state where the vibration of a vehicle engine or the like is transmitted is smaller and as the static stiffness corresponding to the support performance of the engine, the vehicle body and the like, namely, the static spring constant, is larger, higher anti-vibration performances can be attained. Therefore, conventionally, a composition comprising a single natural rubber having a low dynamic magnification and high strength or a blended rubber containing a natural rubber as a main component together with a diene synthetic rubber such as a butadiene rubber or a styrene butadiene rubber as a rubber component and a carbon black.

For example, JP 8-269239 A has proposed, for reducing the dynamic magnification of an anti-vibration rubber, a method in which a carbon black having a specific nitrogen absorption specific surface area and dibutyl phthalate oil absorption number is added to a natural rubber used as a rubber component.

For example, JP 8-73658 A has proposed, for reducing the dynamic magnification, a method in which carbon black is added to a rubber component of an isoprene-based rubber and a butadiene rubber as a rubber composition of an anti-vibration rubber.

For example, JP 2006-143859 A has proposed, for attaining both durability and a low dynamic magnification, a method in which a diene rubber, a hydrazine derivative and a carbon black are contained in an anti-vibration rubber composition.

For example, JP 2011-105870 A has proposed, for attaining both high durability and a low dynamic magnification, also a method in which a carbon black and a silica are contained in a specific amount ratio in a diene rubber as an anti-vibration rubber composition.

SUMMARY OF INVENTION

Technical Problem

However, when the method described in JP 8-269239 A was employed, the dynamic magnification could not be reduced, and when the method described in JP 8-73658 A was employed, the dynamic magnification was required to be further reduced, and there arose a problem in crack growth resistance, which was difficult to cope with.

Besides, the methods described by JP 2006-143859 A and JP 2011-105870 A were not sufficient from the viewpoint of the crack growth resistance, and it was difficult to attain both the crack growth resistance and the low dynamic magnification.

In this manner, the characteristics of the low dynamic magnification and the improvement of the crack growth resistance are in a trade-off relationship in an anti-vibration rubber, and it was difficult to simultaneously improve these characteristics by the conventional compositions.

The present invention was accomplished in consideration of these circumstances, and an object of the present invention is to provide an anti-vibration rubber composition capable of attaining both a low dynamic magnification and crack growth resistance, and an anti-vibration rubber obtained by curing the same.

Solution to Problem

The present inventor has made earnest studies for achieving the above-described object, resulting in finding that a rubber composition comprising a rubber component comprising a diene rubber; a carbon black and a silica as a filler contained in a specific content ratio; and further a hydrazine derivative can achieve the above-described object. The present invention was accomplished based on this finding.

Specifically, the present invention provides:

(1) An anti-vibration rubber composition, comprising: a rubber component comprising 60% by mass or more of a diene rubber; a filler comprising a carbon black and a silica, a content ratio (a/b) between the carbon black (a) and the silica (b) being 10/90 to 90/10 on a mass basis; and a hydrazine derivative;

(2) The anti-vibration rubber composition according to (1), in which a content of the hydrazine derivative is 0.01 to 5.0 parts by mass based on 100 parts by mass of the rubber component;

(3) The anti-vibration rubber composition according to (1) or (2), in which a content of the filler is 10 to 100 parts by mass based on 100 parts by mass of the rubber component; and (4) An anti-vibration rubber obtained by curing the anti-vibration rubber composition according to any one of (1) to (3).

Advantageous Effects of Invention

According to the present invention, an anti-vibration rubber composition capable of attaining both a low dynamic magnification and crack growth resistance and an anti-vibration rubber obtained by curing the same can be provided.

DESCRIPTION OF EMBODIMENT

First, an anti-vibration rubber composition of the present invention will be described.

<Anti-Vibration Rubber Composition>

The anti-vibration rubber composition of the present invention comprises a rubber component, a carbon black and a silica as a filler, and a hydrazine derivative. According to the present invention, the rubber component further comprises 60% by mass or more of a diene rubber, and a content ratio (a/b) between the carbon black (a) and the silica (b) is 10/90 to 90/10 on a mass basis.

The components contained in the anti-vibration rubber composition of the present invention will now be described.

(Diene Rubber)

In the present invention, the type of diene rubber used as a material of the rubber component is not especially limited, and any of a natural rubber, an isoprene rubber, a butadiene rubber, a styrene-butadiene rubber, a chloroprene rubber, an acrylonitrile-butadiene rubber and the like can be used. In the present invention, one of these can be singly used, or two or more of these can be used in combination. From the viewpoint of obtaining effects of attaining basic physical properties such as tensile strength and attaining a low dynamic magnification, it is suitable in the present invention to use a natural rubber singly, or a combination of two or more of these, that is, a natural rubber and another rubber(s).

At this point, a proportion of the diene rubber in the rubber component must be 60% by mass or more, and is preferably 70% by mass or more, and more preferably 80% by mass or more. If the proportion of the diene rubber falls in this range, an anti-vibration rubber composition having a good dynamic magnification can be obtained without impairing the basic physical properties such as tensile strength.

Besides, another rubber such as a known synthetic rubber may be further contained in addition to the rubber component within the scope of the object of the present invention. Specific examples of such a rubber include synthetic rubbers such as an isobutylene-isoprene rubber, a silicone rubber, an acrylic rubber, an ethylene propylene rubber, an acrylate butadiene rubber, a urethane rubber, a chlorosulfonated rubber, chlorinated polyethylene, an epichlorohydrin rubber and a fluororubber. Besides, a modified synthetic rubber obtained by modifying a molecular chain end of any of these synthetic rubbers can be used. One of, or two or more of these synthetic rubbers and modified synthetic rubbers may be appropriately selectively used.

(Carbon Black)

The carbon black contained in the anti-vibration rubber composition of the present invention is not especially limited. Examples include standard carbon blacks of SRF (semi-reinforcing furnace), GPF (general purpose furnace), FEF (fast extruding furnace), HAF (high abrasion furnace), ISAF (intermediate super abrasion furnace), SAF (super abrasion furnace), FT (fine thermal) and MT (medium thermal).

In the present invention, FEF carbon black can be particularly suitably used. Besides, one of these carbon blacks may be singly used, or two or more of these may be used together. Incidentally, from the viewpoint of improving the basic physical properties of a resultant anti-vibration rubber to attain a lower dynamic magnification, the carbon black preferably has an iodine adsorption number of 10 to 70 mg/g and a DBP adsorption number (dibutyl phthalate oil adsorption number) of 30 to 180 ml/100 g.

A content of the carbon black is not especially limited, and is preferably 5 to 100 parts by mass and more preferably 5 to 60 parts by mass based on 100 parts by mass of the rubber component.

(Silica)

Examples of the silica contained in the anti-vibration rubber composition of the present invention include known wet silica (hydrous silicic acid), dry silica (anhydrous silicic acid) and colloidal silica. In particular, the wet silica can be suitably used in the present invention. Incidentally, the silica has a BET specific surface area of preferably 30 to 230 $m^2/g$ and more preferably 80 to 200 $m^2/g$. If the BET specific surface area is 30 to 230 $m^2/g$, aggregation of particles can be suppressed, and in addition, since a surface area necessary for reinforcement can be attained, crack growth resistance of the resultant anti-vibration rubber can be easily improved.

A content of the silica is not especially limited, and is preferably 5 to 100 parts by mass and more preferably 5 to 60 parts by mass based on 100 parts by mass of the rubber component. The content of the silica preferably falls in this range because the crack growth resistance can be thus easily improved.

In the anti-vibration rubber composition of the present invention, a content ratio between the carbon black and the silica, in terms of the content ratio (a/b) between the carbon black (a) and the silica (b), is required to be 10/90 to 90/10 on a mass basis. From the viewpoint of improving the effects of attaining the low dynamic magnification and the crack growth resistance of the resultant anti-vibration rubber, the content ratio (a/b) is preferably 20/80 to 80/20 and more preferably 40/60 to 60/40 on a mass basis.

A total content of the carbon black and the silica is preferably 10 to 100 parts by mass and more preferably 10 to 60 parts by mass based on 100 parts by mass of the rubber component. The total content of the carbon black and the silica preferably falls in this range because thus an anti-vibration rubber composition capable of improving the basic physical properties and the low dynamic magnification of the resultant anti-vibration rubber can be easily obtained.

(Hydrazine Derivative)

The hydrazine derivative used in the anti-vibration rubber composition of the present invention is not especially limited as long as it is a compound derived from hydrazine ($H_2NNH_2$) and having a hydrazine-derived N—N bond. If the compound has a hydrazine-derived N—N bond, the aggregation of the carbon black and the silica in the anti-vibration rubber composition is suppressed so as to improve dispersibility, and hence, the resultant anti-vibration rubber can be excellent in the low dynamic magnification and the crack growth resistance.

An example of the compound derived from hydrazine ($H_2NNH_2$) and having a hydrazine-derived N—N bond (i.e., the hydrazine derivative) includes a compound obtained by dehydration condensation, with a carbonyl compound, of one or both of two amino groups included in hydrazine. Examples of the carbonyl compound include an aldehyde, a ketone compound, a carboxylic acid and carbonic acid, among which a carboxylic acid is preferably used.

As the carboxylic acid, any of various carboxylic acids including dicarboxylic acids such as isophthalic acid, adipic acid, terephthalic acid, azelaic acid, succinic acid and eicosanoic dicarboxylic acid; aromatic monocarboxylic acids such as naphthalenecarboxylic acid, benzoic acid and salicylic acid; and heterocyclic monocarboxylic acids such as isonicotinic acid can be used.

In particular, the hydrazine derivative is preferably a compound represented by any one of the following general formulas (I) to (III):

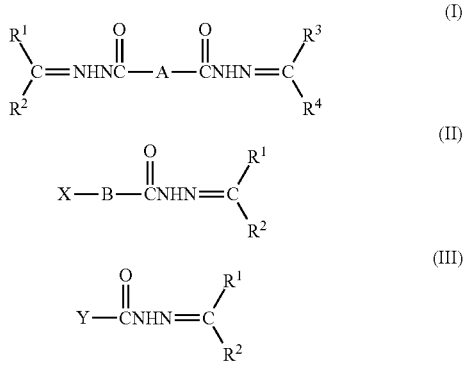

In the aforementioned formulas, A represents a single bond, a divalent group derived from an aromatic ring, a divalent group derived from a hydantoin ring that may have a substituent, or a divalent group derived from a saturated or unsaturated straight chain hydrocarbon having 1 to 18 carbon atoms, B represents a divalent group derived from an aromatic ring, X represents a hydroxyl group or an amino group, Y represents a pyridyl group or hydrazino group, $R^1$ to $R^4$ each independently represent a hydrogen atom, an alkyl group having 1 to 18 carbon atoms, a cycloalkyl group or a monovalent aromatic ring group.

In the general formula (I), A represents any one divalent linking group selected from the group consisting of a single bond, a divalent group derived from an aromatic ring, a divalent group derived from a hydantoin ring that may have a substituent, and a divalent group derived from a saturated or unsaturated straight chain hydrocarbon having 1 to 18 carbon atoms.

Examples of the divalent group derived from an aromatic ring include a phenylene group, a naphthylene group, a pyridilene group and a quinolylene group in which the linking site is any one of ortho position, para position and meta position.

Examples of the substituent that may be included in the divalent group derived from a hydantoin ring include a hydrocarbon group having 1 to 6 carbon atoms, a halogen atom and a hydroxy group.

The divalent group derived from a saturated or unsaturated straight chain hydrocarbon having 1 to 18 carbon atoms refers to a divalent group in which carbon atoms at the ends of a saturated or unsaturated straight chain hydrocarbon having 1 to 18 carbon atoms are linking sites, and examples include an ethylene group, a tetramethylene group, a heptamethylene group, an octamethylene group, an octadecamethylene group, a 7,11-octadecadienylene group.

In the general formula (II), B represents a divalent group derived from an aromatic ring, and specific examples include divalent aromatic groups such as a phenylene group and a naphthylene group.

In the general formula (II), X represents a hydroxy group or an amino group. In a sense, X is a substituent of B, and the substitution position may be any of ortho position, meta position and para position, and is preferably ortho position.

In the general formula (III), Y represents a pyridyl group or a hydrazino group. If Y represents a pyridyl group, the linking site to a carbonyl group in the general formula (III) is preferably 2-position or 3-position.

In the general formulas (I) to (III), $R^1$ to $R^4$ each independently represent a hydrogen atom, an alkyl group having 1 to 18 carbon atoms, a cycloalkyl group or a monovalent aromatic ring group.

The alkyl group having 1 to 18 carbon atoms may be straight chain or branched chain, and examples include a methyl group, an ethyl group, a propyl group, an isopropyl group, an n-butyl group, a t-butyl group, an n-hexyl group, an octyl group, a dodecyl group and an octadecyl group.

Examples of the cycloalkyl group include cycloalkyl groups having 5 to 10 carbon atoms, and specific examples include a cyclohexyl group and a cyclooctyl group.

Examples of the monovalent aromatic ring group include monovalent groups derived from an aromatic ring having 6 to 20 carbon atoms, and specific examples include a phenyl group, a naphthyl group and an anthracenyl group.

Among these, a hydrogen atom, an alkyl group having 1 to 12 carbon atoms, a cycloalkyl group having 5 to 8 carbon atoms and a phenyl group are particularly preferably used as $R^1$ to $R^4$.

An example of a specific compound represented by the general formula (I) includes a derivative of dicarboxylic acid dihydrazide.

Specific examples include derivatives of isophthalic acid dihydrazide and adipic acid hydrazide such as isophthalic acid di(1-methylethylidenekydrazide, adipic acid di(1-methylethylidenekydrazide, isophthalic acid di(1-methylpropylidene)hydrazide, adipic acid di(1-methylpropylidenekydrazide, isophthalic acid di(1,3-dimethylpropylidene) hydrazide, adipic acid di(1,3-dimethylpropylidene) hydrazide, isophthalic acid di(1-phenylethylidene)hydrazide and adipic acid di(1-phenylethylidenekydrazide.

In addition to these derivatives of isophthalic acid dihydrazide and adipic acid dihydrazide, also the following dihydrazide compounds may be used.

The examples include derivatives of dicarboxylic acid dihydrazide such as terephthalic acid dihydrazide, azelaic acid dihydrazide, succinic acid dihydrazide and eicosanoic dicarboxylic acid dihydrazide. Among these, isophthalic acid dihydrazide is preferably used as the dicarboxylic acid dihydrazide because it is excellent in the effect of attaining a low dynamic magnification.

An example of a specific compound represented by the general formula (II) includes a derivative of aromatic monocarboxylic acid hydrazide.

Specific examples include derivatives of 2-naphthalene acid-3-hydroxy hydrazide such as 2-naphthalene acid-3-hydroxy(1-methylethylidene)hydrazide, 2-naphthalene acid-3-hydroxy(1-methylpropylidene)hydrazide, 2-naphthalene acid-3-hydroxy(1,3-dimethylpropylidene)hydrazide and 2-naphthalene acid-3-hydroxy(1-phenylethylidene)hydrazide.

In addition to these derivatives of 2-naphthalene acid-3-hydroxy hydrazide, the examples include derivatives of salicylic acid hydrazide, 4-hydroxybenzoic acid hydrazide, anthranilic acid hydrazide and 1-hydroxy-2-naphthalene acid hydrazide. Among these, a derivative of 2-naphthalene acid-3-hydroxy hydrazide, and 2-napthalene acid-3-hydroxy (1-methylethylidene)hydrazide in particular, is preferably used because it is excellent in the effect of attaining a low dynamic magnification.

An example of a specific compound represented by the general formula (III) includes a derivative of a heterocyclic monocarboxylic acid hydrazide.

Specific examples include derivatives of isonicotinic acid hydrazide such as isonicotinic acid (1-methylethylidene) hydrazide, isonicotinic acid (1-methylpropylidene)hydrazide, isonicotinic acid (1,3-dimethylpropylidene)hydrazide and isonicotinic acid (1-phenylethylidene)hydrazide.

In addition to these derivatives of isonicotinic acid hydrazide, a derivative of carbonic acid dihydrazide may be used.

Incidentally, a method for synthesizing a hydrazide compound represented by any of the above-described general formulas (I) to (III) is described in Pant, U. C. Ramchandran, Reena; Joshi, B. C. Rev. Roum. Chim. (1979) 24(3), 471-82.

A single one of or a mixture of two or more of the hydrazine derivatives represented by the general formulas (I) to (III) may be used.

A content of the hydrazine derivative in the anti-vibration rubber composition is preferably 0.01 to 5 parts by mass, more preferably 0.01 to 3 parts by mass and further preferably 0.1 to 0.5 parts by mass based on 100 parts by mass of the rubber component. If the content of the hydrazine derivative is 0.01 parts by mass or more, the effect of attaining a low dynamic magnification and the crack growth resistance owing to the hydrazine derivative can be sufficiently easily obtained, and if it is 3 parts by mass or less, the other physical properties of the anti-vibration rubber are not easily impaired.

(Additional Components)

The anti-vibration rubber composition of the present invention may appropriately comprise, in addition to the rubber component of the present invention, the carbon black and the silica used as the filler, and the hydrazine derivative, any of various additives such as a crosslinking agent, a vulcanization accelerator, zinc oxide, a fatty acid, a filler excluding the carbon black and the silica (hereinafter referred to as the second filler), a silane coupling agent, an anti-aging agent, a plasticizer, a softener and a processing aid as long as the object of the present invention is not impaired. These components will now be described.

The crosslinking agent is not especially limited, but can be appropriately selected in accordance with the purpose. Examples include a sulfur-based crosslinking agent, an organic peroxide-based crosslinking agent, an inorganic crosslinking agent, a polyamine crosslinking agent, a resin crosslinking agent, a sulfur compound-based crosslinking agent, an oxime-nitrosamine-based crosslinking agent, and sulfur, among which sulfur is preferred as the crosslinking agent used in the anti-vibration rubber composition.

A content of the crosslinking agent in the anti-vibration rubber composition is not especially limited but can be appropriately selected in accordance with the purpose, and is preferably 0.3 to 10 parts by mass based on 100 parts by mass of the rubber component. If the content of the crosslinking agent is 0.3 parts by mass or more, the cross-linkage can be caused to definitely proceed, and if it is 10 parts by mass or less, cross-linkage proceeding during kneading due to a part of the crosslinking agent or damage of the physical properties of a resultant crosslinked substance can be prevented.

A content of the sulfur in the anti-vibration rubber composition is not especially limited but can be appropriately selected in accordance with the purpose, and is preferably 0.3 to 5 parts by mass based on 100 parts by mass of the rubber component. If the content of the sulfur is 0.3 parts by mass or more, a sufficient vulcanizing effect is obtained to easily achieve desired performance. Besides, if the content of the sulfur is 5 parts by mass or less, the cross-linkage of the rubber component in the anti-vibration rubber composition does not proceed too much, which can inhibit the resultant anti-vibration rubber from becoming brittle so as to suppress lowering of the fatigue performance of the rubber.

Examples of the vulcanization accelerator include sulfenamide-based vulcanization accelerators such as CBS (N-cyclohexyl-2-benzothiazylsulfenamide), TBBS (N-t-butyl-2-benzothiazylsulfenamide) and TBSI (N-t-butyl-2-benzothiazylsulfeneimide); guanidine-based vulcanization accelerators such as DPG (diphenylguanidine); thiuram-based vulcanization accelerators such as TMTD (tetramethylthiuram disulfide), TETD (tetraethylthiuram disulfide), TBTD (tetrabutylthiuram disulfide) and tetrabenzylthiuram disulfide; and zinc dialkyl dithiophosphate. One of these may be singly used, or two or more of these may be used together.

A content of the vulcanization accelerator is preferably 0.1 to 3 parts by mass and more preferably 0.5 to 2.5 parts by mass based on 100 parts by mass of the rubber component.

In the present invention, from the viewpoint of accelerating the vulcanization, the anti-vibration rubber composition may comprise a vulcanization accelerator aid such as zinc oxide or a fatty acid. The fatty acid may be any of saturated, unsaturated, straight chain and branched chain fatty acids. Besides, the number of carbon atoms is not especially limited, and a fatty acid having, for example, 1 to 30 carbon atoms, and preferably 15 to 30 carbon atoms can be used.

Specific examples of the fatty acid include cyclohexanoic acid (cyclohexane carboxylic acid), naphthenic acid such as alkyl cyclopentane having a side chain, hexanoic acid, octanoic acid, decanoic acid (including branched carboxylic acid such as neodecanoic acid), saturated fatty acids such as dodecanoic acid, tetradecanoic acid, hexadecanoic acid and octadecanoic acid (stearic acid), unsaturated fatty acids such as methacrylic acid, oleic acid, linoleic acid and linolenic acid, and resin acids such as rosin, tall oil acid and abietic acid. One of these may be singly used, or two or more of these may be used together. In the present invention, zinc oxide and stearic acid can be suitably used. A content of such a vulcanization accelerator aid in the anti-vibration rubber composition is not especially limited, and can be preferably 1 to 10 parts by mass and more preferably 2 to 7 parts by mass based on 100 parts by mass of the rubber component. If the content of the vulcanization accelerator aid is 1 part by mass or more, kneading workability of the anti-vibration rubber composition is difficult to impair, and hence the increase of the dynamic magnification can be inhibited, and if it is 10 parts by mass or less, vulcanization delay is difficult to occur.

As the second filler, an inorganic filler such as fine particle magnesium silicate, heavy calcium carbonate, magnesium carbonate, clay or talc, or an organic filler such as a high styrene resin, a coumarone-indene resin, a phenol resin, lignin, a modified melamine resin or a petroleum resin can be used. One of these can be singly used, or two or more of these can be used in combination.

From the viewpoint of improving the dispersibility of the silica in the anti-vibration rubber composition and improving the reinforcing property of the anti-vibration rubber, the anti-vibration rubber composition of the present invention can comprise a silane coupling agent.

Examples of the silane coupling agent include vinyltriethoxysilane, vinyl tris(β-methoxyethoxy)silane, γ-methacryloxypropyltrimethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β(aminoethyl)-γ-aminopropyltrimethoxysilane, bis-triethoxysilylpropyl tetrasulfide and bis-triethoxysilylpropyl disulfide.

A single one of or a combination of two or more of these silane coupling agents can be used. Besides, its content is not especially limited, and can be preferably 1 to 10% by mass and more preferably 5 to 10% by mass based on the content of the silica. If the content of the silane coupling agent is 1% by mass or more based on the content of the silica, the effects of improving the dispersibility of the silica and the reinforcing property of the anti-vibration rubber can be easily sufficiently exhibited, and if it is 10% by mass or less, excessive blending of the silane coupling agent is suppressed, which is preferable also from the economical point of view.

The anti-aging agent is not especially limited but any of known agents can be used, and examples include phenol-based anti-aging agents, imidazole-based anti-aging agents and amine-based anti-aging agents. One of these anti-aging agents can be singly used, or two or more of these can be used together. A content of the anti-aging agent is preferably 1 to 10 parts by mass and more preferably 1 to 7 parts by mass based on 100 parts by mass of the rubber component.

Examples of the plasticizer include waxes such as known paraffin waxes and microcrystalline waxes, and amide compounds such as stearic acid amide, oleic acid amide and erucic acid amide, and one of these may be singly used, or two or more of these may be used together. In particular, the paraffin waxes and microcrystalline waxes can be suitably used in the present invention. Molding workability can be improved if these waxes are comprised. The content thereof is not especially limited, and can be preferably 0.5 to 10 parts by mass based on 100 parts by mass of the rubber component.

The softener is not especially limited but any of known softeners can be used, and specifically, process oils such as aromatic oils, naphthenic oils and paraffin oils; vegetable oils such as coconut oil; synthetic oils such as alkylbenzene oil; and castor oil can be used. In the present invention, a naphthenic oil can be suitably used. One of these can be singly used, or two or more of these can be used in combination. A content of the softener is not especially limited, and can be preferably 1 to 80 parts by mass based on 100 parts by mass of the rubber component. If the content falls in this range, the kneading workability of the anti-vibration rubber composition is difficult to impair.

Incidentally, if an oil-extended rubber (namely, a rubber containing a softener) is used as the rubber component, the content may be adjusted so that a total content of the softener contained in the oil-extended rubber and a softener separately added in mixing can fall in the above-described range.

Besides, the anti-vibration rubber composition of the present invention may contain, in addition to the aforementioned components, generally used additives, such as an antioxidant, a lubricant, a tackifier, a petroleum-based resin, a UV absorber, a dispersant, a compatibilizer, a homogenizing agent and a vulcanization retarder, if necessary.

In obtaining the anti-vibration rubber composition of the present invention, a method for blending the aforementioned components is not especially limited, and all the components may be blended at one time to be kneaded, or the respective components may be blended dividedly in two or three steps to be kneaded. Incidentally, in kneading the components, any of known mixers such as a roll, an internal mixer and a Banbury rotor can be used. Besides, if the resultant kneaded substance is to be molded into a shape of a sheet or a belt, any of known molding machines such as an extruder and a press may be used.

<Anti-Vibration Rubber>

The anti-vibration rubber of the present invention is obtained by curing the anti-vibration rubber composition.

The curing of the anti-vibration rubber composition can be performed, for example, by blending the aforementioned crosslinking agent with the anti-vibration rubber composition and heating the resultant.

Curing conditions (vulcanizing conditions) employed in curing the anti-vibration rubber composition are not especially limited, and conditions of 140 to 180° C. and preferably 150 to 170° C. and 5 to 120 minutes can be generally employed.

The anti-vibration rubber obtained by curing the anti-vibration rubber composition of the present invention is suitably used as, but not limited to, an anti-vibration rubber to be used under harsh environment requiring a low dynamic magnification and crack growth resistance, and in particular, an anti-vibration rubber to be used in an engine mount, a strut mount, a body mount, a suspension bush or the like of a vehicle.

Examples

The present invention will now be described in detail with reference to examples and comparative examples, and it is noted that the present invention is not limited to the following examples.

The influences of the content ratio of the filler in the anti-vibration rubber composition and the hydrazine derivative were studied. Respective components shown in Table 1 below were kneaded to obtain anti-vibration rubber compositions of examples and comparative examples. Each of the obtained anti-vibration rubber compositions was cured by vulcanization under prescribed conditions to obtain an anti-vibration rubber as a sample, and hardness (Hd), a dynamic magnification ($Kd_{100}/Ks$) and crack growth resistance of the thus obtained anti-vibration rubber were evaluated in accordance with JIS standards described below.

Incidentally, as a sample used in each evaluation, a sheet having a length of 120 mm, a width of 120 mm and a thickness of 2 mm was formed from each of the anti-vibration rubber compositions, and an anti-vibration rubber sheet obtained by curing this sheet by vulcanization was cut to obtain a test piece according to each of the JIS standards.

In the evaluation of the dynamic magnification ($Kd_{100}/Ks$), however, a cylindrical sample having a diameter of 30 mm and a height of 30 mm was used as the sample.

[Hardness (Hd)]

The test piece of the anti-vibration rubber of each of the examples and the comparative examples was used for measurement in accordance with JIS K6253 (type A).

[Dynamic Spring Constant ($Kd_{100}$) and Dynamic Magnification ($Kd_{100}/Ks$)]

The sample of each of the examples and the comparative examples was measured for a static spring constant Ks in accordance with JIS K6385 as follows: In a bidirectional loading method of a static characteristic test, deflection of 0 mm to +4.5 mm was caused three times at a rate of displacement of 20 mm/min in a perpendicular direction to the axis of the test piece, a load-deflection relationship was measured during the third loading, and on the basis of this relationship, the static spring constant Ks was calculated by a calculation method described in this standard in a range of the deflection of 1.5 to 3.0 mm.

A dynamic spring constant Kd of each sample was measured in accordance with JIS K6385 by employing a non-resonance method of a dynamic characteristic test under load causing deflection of 10% (3 mm) in the direction perpendicular to the axis of the test piece under conditions of a vibration frequency of 100 Hz and a vibration amplitude of ±0.05 mm. A lower dynamic magnification ($Kd_{100}/Ks$) means that the anti-vibration performance is better (the lower dynamic magnification is lower).

[Crack Growth Resistance]

As a sample obtained in each of the examples and the comparative examples, a JIS No. 5 test piece was penetrated at the center by a pin having a diameter ϕ of 1 mm to form a hole therein, and was repeatedly fatigued at 35° C. with constant strain of 0 to 100%, and the number of times of causing fatigue was counted until the sample was broken for making evaluation. As the evaluation, an index obtained on the assumption that the result obtained in Comparative Example 1 was 100. A larger index means that the number of times of causing fatigue until the sample was broken is larger, and that crack growth resistance is better.

The evaluation results are shown in Table 1. Assuming that the values of the dynamic magnification (Kd100/Ks) and the crack growth resistance obtained in Comparative Examples A1, B1, C1, D1, E1 and F1 are respectively 100, values obtained in corresponding ones of the examples and comparative examples are calculated as indexes to be shown in the table. Comparative Example A1 corresponds to Comparative Example A2. Comparative Example B1 corresponds to Comparative Example B2. Comparative Example C1 corresponds to Examples C1 to C3. Comparative Example D1 corresponds to Example D1. Comparative Example E1 corresponds to Example E1. Comparative Example F1 corresponds to Example F1.

Incidentally, as the dynamic magnification is lower, the anti-vibration performance is better, and therefore, a smaller index of the dynamic magnification means a lower dynamic magnification. Besides, with respect to the crack growth resistance, a larger value means higher resistance.

TABLE 1

| | | Comparative Example A1 | Comparative Example A2 | Comparative Example B1 | Comparative Example B2 |
|---|---|---|---|---|---|
| Composition (parts by mass) | Natural Rubber | 100 | 100 | 100 | 100 |
| | Butadiene Rubber | — | — | — | — |
| | Carbon Black | 40 | 40 | — | — |
| | Silica | — | — | 40 | 40 |
| | Hydrazine Derivative | — | 0.2 | — | 0.2 |
| | Stearic Acid | 2 | 2 | 2 | 2 |
| | Zinc Oxide | 5 | 5 | 5 | 5 |
| | Wax | 1 | 1 | 1 | 1 |
| | Anti-aging agent RD | 1 | 1 | 1 | 1 |
| | Anti-aging agent 6C | 1 | 1 | 1 | 1 |
| | Oil | 2 | 2 | 2 | 2 |
| | Sulfur | 1.5 | 1.5 | 1.5 | 1.5 |
| | Accelerator CZ | 1 | 1 | 1 | 1 |
| Evaluation | Hardness (Hd) | 59 | 58 | 59 | 60 |
| | Dynamic Magnification (Kd100/Ks) | 1.62 | 1.56 | 2.01 | 1.94 |
| | Dynamic Magnification (Kd100/Ks) (index) | 100 | 96 | 100 | 97 |
| | Crack Growth Resistance (index) | 100 | 97 | 100 | 98 |

| | | Comparative Example C1 | Example C1 | Example C2 | Example C3 |
|---|---|---|---|---|---|
| Composition (parts by mass) | Natural Rubber | 100 | 100 | 100 | 100 |
| | Butadiene Rubber | — | — | — | — |
| | Carbon Black | 20 | 20 | 20 | 20 |
| | Silica | 20 | 20 | 20 | 20 |
| | Hydrazine Derivative | — | 0.2 | 0.1 | 0.5 |
| | Stearic Acid | 2 | 2 | 2 | 2 |
| | Zinc Oxide | 5 | 5 | 5 | 5 |
| | Wax | 1 | 1 | 1 | 1 |
| | Anti-aging agent RD | 1 | 1 | 1 | 1 |
| | Anti-aging agent 6C | 1 | 1 | 1 | 1 |
| | Oil | 2 | 2 | 2 | 2 |
| | Sulfur | 1.5 | 1.5 | 1.5 | 1.5 |
| | Accelerator CZ | 1 | 1 | 1 | 1 |
| Evaluation | Hardness (Hd) | 61 | 60 | 61 | 58 |
| | Dynamic Magnification (Kd100/Ks) | 1.66 | 1.49 | 1.55 | 1.43 |
| | Dynamic Magnification (Kd100/Ks) (index) | 100 | 90 | 93 | 86 |
| | Crack Growth Resistance (index) | 100 | 118 | 111 | 125 |

| | | Comparative Example D1 | Example D1 | Comparative Example E1 | Example E1 | Comparative Example F1 | Example F1 |
|---|---|---|---|---|---|---|---|
| Composition (parts by mass) | Natural Rubber | 100 | 100 | 100 | 100 | 80 | 80 |
| | Butadiene Rubber | — | — | — | — | 20 | 20 |
| | Carbon Black | 35 | 35 | 5 | 5 | 20 | 20 |
| | Silica | 5 | 5 | 35 | 35 | 20 | 20 |
| | Hydrazine Derivative | — | 0.2 | — | 0.2 | — | 0.2 |
| | Stearic Acid | 2 | 2 | 2 | 2 | 2 | 2 |
| | Zinc Oxide | 5 | 5 | 5 | 5 | 5 | 5 |
| | Wax | 1 | 1 | 1 | 1 | 1 | 1 |
| | Anti-aging agent RD | 1 | 1 | 1 | 1 | 1 | 1 |

TABLE 1-continued

|  |  |  |  |  |  |  |  |
|---|---|---|---|---|---|---|---|
|  | Anti-aging agent 6C | 1 | 1 | 1 | 1 | 1 | 1 |
|  | Oil | 2 | 2 | 2 | 2 | 2 | 2 |
|  | Sulfur | 1.5 | 1.5 | 1.5 | 1.5 | 1.5 | 1.5 |
|  | Accelerator CZ | 1 | 1 | 1 | 1 | 1 | 1 |
| Evaluation | Hardness (Hd) | 60 | 59 | 59 | 58 | 60 | 60 |
|  | Dynamic Magnification (Kd100/Ks) | 1.6 | 1.5 | 1.92 | 1.79 | 1.56 | 1.47 |
|  | Dynamic Magnification (Kd100/Ks) (index) | 100 | 94 | 100 | 93 | 100 | 94 |
|  | Crack Growth Resistance (index) | 100 | 114 | 100 | 106 | 100 | 131 |

The details of respective components shown in Table 1 are as follows:

Natural rubber: "RSS#1"

Butadiene rubber: "BR01" manufactured by JSR Corporation, content of cis-1,4 bond: 96%, content of vinyl bond: 2%

Carbon black: FEF carbon black "Asahi #65" manufactured by Asahi Carbon Co., Ltd., iodine adsorption number: 43 g/kg, DBP adsorption number: 121 ml/100 g Silica: "Nipsil AQ" manufactured by Tosoh Silica Corporation, BET specific surface area: 190 m$^2$/g Hydrazine derivative: isophthalic acid dihydrazide Stearic acid: "Stearic acid 505" manufactured by New Japan Chemical Co., Ltd.

Zinc oxide: "No. 3 zinc oxide" manufactured by HakusuiTech Co., Ltd.

Anti-aging agent RD: 2,2,4-trimethyl-1,2-dihydroquinoline polymer, "Nocrac 224" manufactured by Ouchi Shinko Chemical Industrial Co., Ltd.

Anti-aging agent 6C: N-phenyl-N'-(1,3-dimethylbutyl)-p-phenylenediamine, "Nocrac 6C" manufactured by Ouchi Shinko Chemical Industrial Co., Ltd.

Oil: paraffin-based oil

Sulfur: "Sulfur Powder" manufactured by Tsurumi Kagaku Kogyo Kabushikikaisha

Accelerator CZ: sulfenamide-based vulcanization accelerator, "Nocceler CZ-G" manufactured by Ouchi Shinko Chemical Industrial Co., Ltd.

It was confirmed, based on the results shown in Table 1, that a low dynamic magnification and crack growth resistance can be both attained by an anti-vibration rubber composition that uses a rubber component containing a diene rubber, comprises a carbon black and a silica as filler, contains the filler in a specific content ratio, and further comprises a hydrazine derivative.

In Comparative Examples A1, A2, B1 and B2, in a case where the carbon black or the silica was singly contained as the filler in the anti-vibration rubber composition, if the hydrazine derivative was comprised, the effect of lowering the dynamic magnification was not remarkably exhibited, and the crack growth resistance was not improved.

On the other hand, in comparison between Comparative Example C1 and Examples C1 to C3, in a case where the carbon black and the silica were both contained as the filler and the hydrazine derivative was comprised, both the dynamic magnification and the crack growth resistance were remarkably improved.

Similarly, in comparison between Comparative Example D1 and Example D1 and comparison between Comparative Example E1 and Example E1, in a case where both the carbon black and the silica were contained as the filler and the hydrazine derivative was comprised, even if the content ratio between the carbon black and the silica used as the filler was changed, both the dynamic magnification and the crack growth resistance were remarkably improved. Besides, in comparison between Comparative Example F1 and Example F1, even if the butadiene rubber was comprised as a diene rubber component, both the dynamic magnification and the crack growth resistance were remarkably improved.

The invention claimed is:

1. An anti-vibration rubber composition, comprising:
a rubber component consisting of a natural rubber;
a filler comprising a carbon black having an iodine adsorption number of 10 to 70 mg/g and a DBP adsorption number of 30 to 180 ml/100 g and a silica, a content ratio (a/b) between the carbon black (a) and the silica (b) being 10/90 to 90/10 on a mass basis; and
a hydrazine derivative.

2. The anti-vibration rubber composition according to claim 1, wherein a content of the hydrazine derivative is 0.01 to 5.0 parts by mass based on 100 parts by mass of the rubber component.

3. The anti-vibration rubber composition according to claim 1, wherein a content of the filler is 10 to 100 parts by mass based on 100 parts by mass of the rubber component.

4. An anti-vibration rubber obtained by curing the anti-vibration rubber composition according to claim 1.

5. The anti-vibration rubber composition according to claim 1, wherein the carbon black is FEF carbon black.

* * * * *